Feb. 20, 1951 M. P. VUCASSOVICH 2,542,382
APPARATUS FOR BRINING FISH
Filed Nov. 15, 1945 2 Sheets-Sheet 1

Inventor
Michael P. Vucassovich
by Wright, Brown, Quinby & May
Attys.

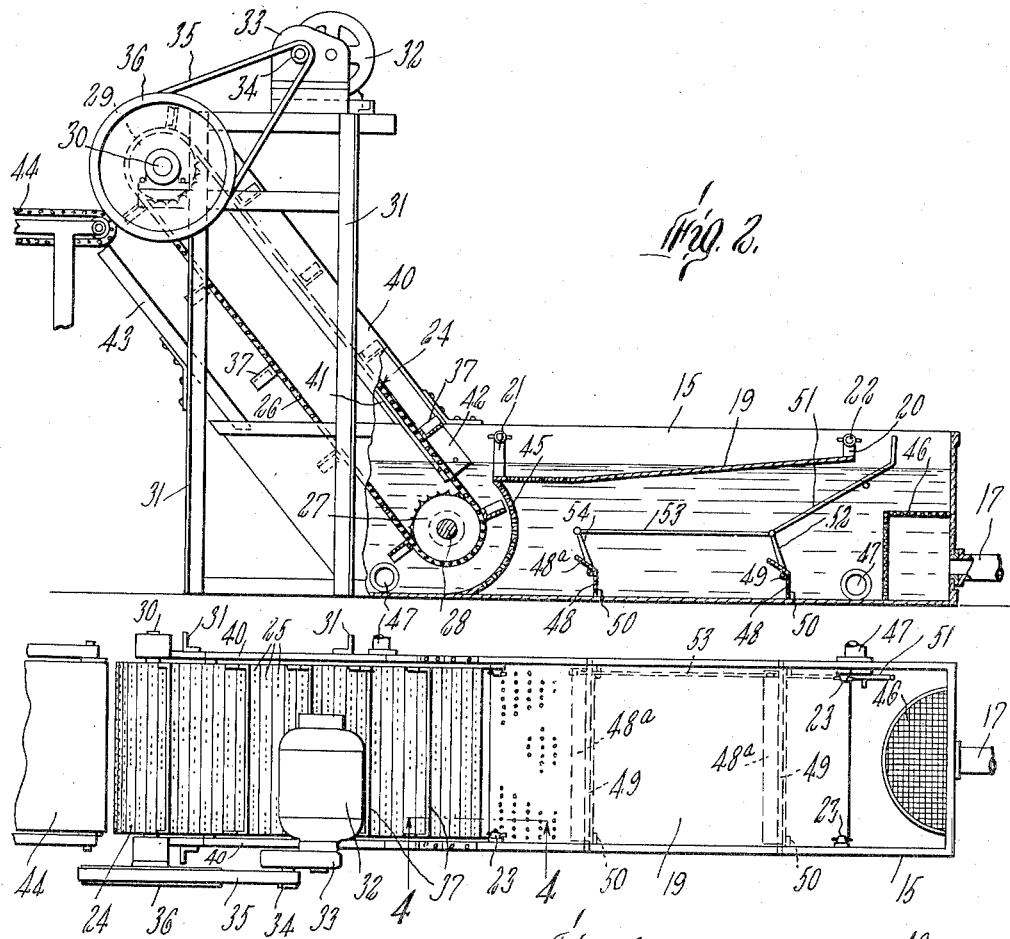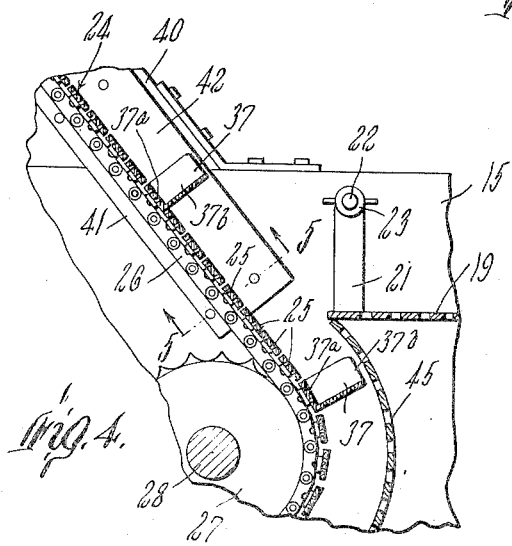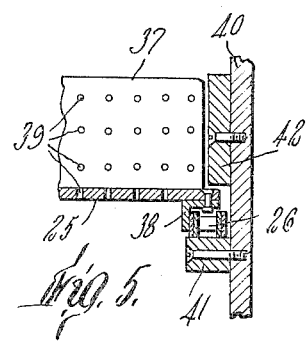

Patented Feb. 20, 1951

2,542,382

UNITED STATES PATENT OFFICE 2,542,382

APPARATUS FOR BRINING FISH

Michel P. Vucassovich, Beverly, Mass., assignor to Edward Renneburg & Sons Company, Baltimore, Md., a corporation of Delaware Application November 15, 1945, Serial No. 628,809

5 Claims. (Cl. 99—254)

This invention relates to the art of preparing food for the market and is concerned with the step of washing the foodstuffs in brine, whereby to add a small increment of salt as well as to remove objectionable adherent matter which may be present. It is applicable to many kinds of food, principally fillets and other fish pieces, but also mollusks, such as oysters and clams when removed from their shells, the flesh of other shell fish, pieces of meat and vegetables, and in general all foodstuffs which may need brining preparatory to freezing for preservation, or for marketing in unfrozen condition.

The object of the invention is to furnish a simple and compact, but highly efficient automatic apparatus by which the pieces of foodstuffs may be tumbled in brine and conveyed from the brine to a station for packaging or other processing.

One phase of the invention is the brining of fish fillets as a step in a continuous procedure of cutting fillets from whole fish and inspecting, brining, packaging, and freezing the fillets. In this phase of the invention my apparatus comprises the combination of a brining tank with a flume or a plurality of flumes in which fillets or other fish pieces are placed and through which brine is caused to flow into the tank, and means for causing progress of the brine and fish pieces toward one end of the tank, removal of the pieces from the brine, and flow of the brine away from the removal conveyer to the flume or flumes. In this combination the brine issuing from the flume causes a turbulence and initial flow toward the discharging conveyer. The invention, however, is not restricted to this combination, but includes embodiments comprising a tank and other means than a flume for delivering brine into the tank and initiating a flow therein.

The invention is illustrated by means of drawings, in which,

Fig. 2 is a side elevation and partial section of a part of the apparatus in which new constructions and principles are contained;

Fig. 3 is a plan view of the parts of the brining apparatus shown in Fig. 2;

Fig. 4 is a fragmentary vertical section of part of the apparatus taken on line 4—4 of Fig. 3;

Fig. 5 is a detail sectional view taken on line 5—5 of Fig. 4;

Like reference characters designate the same parts wherever they occur in all the figures.

Figure 1:
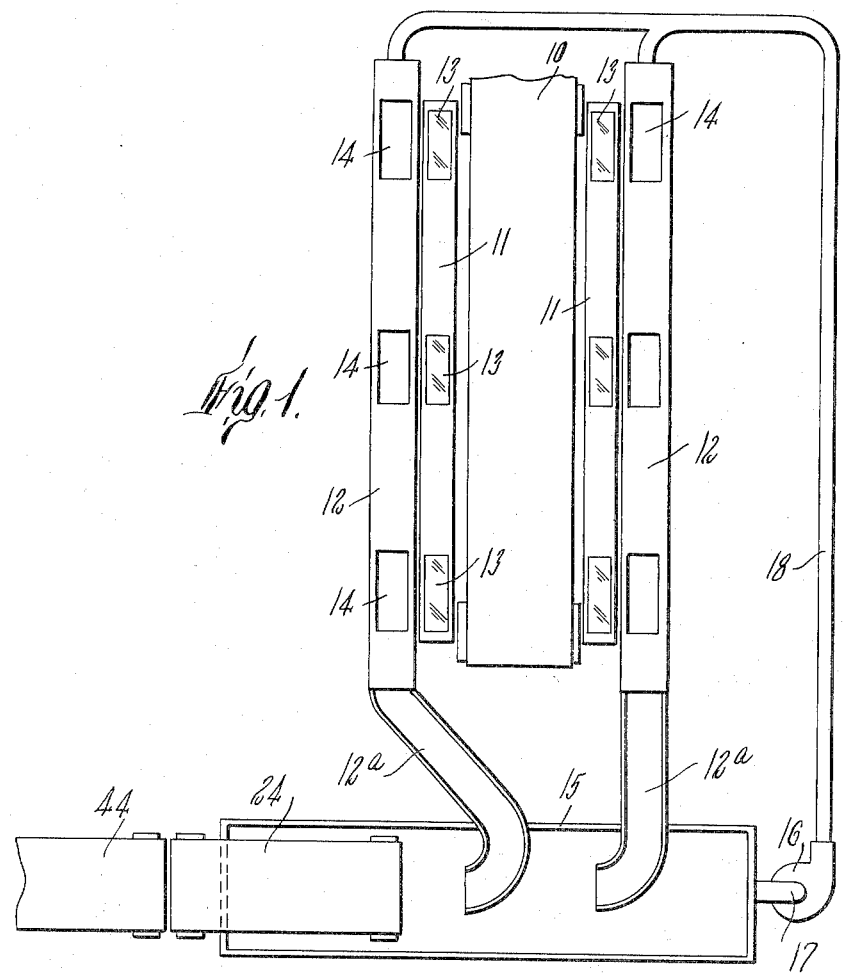
Fig. 1 is a diagrammatic plan view of a typical embodiment of the entire combined apparatus.

In the diagrammatic layout shown in Fig. 1, 10 represents a conveyer belt by which fillets are carried from the room where they are cut from whole fish to the inspection room. At opposite sides of the conveyer are candling tables 11 and flumes 12. The candling tables are elongated enclosed boxes containing electric lamps and having opaque walls except for translucent panes 13 which are set over openings in the top wall at the different operators' stations. The flumes extend close beside and slightly below the candling tables. They are substantially horizontal, with possibly a slight downward inclination throughout the length of the space where the inspectors are stationed. In this diagram three operators' stations are indicated at each side of the conveyer, but there may be any number. The flumes may be open at the top throughout their length, or may be provided with covers separated by spaces at the operators' stations, or each may have a continuous cover with openings through it at these stations. The candling tables are close beside the conveyer and the flumes close beside the candling tables in locations convenient for operators sitting at the several stations to reach over to the conveyer, pick up a fillet, lay the fillet on the translucent pane of the candling table and, if the fillet shows no defect, drop it into the adjacent opening 14 of the flume.

Beyond the endmost one of the operators' stations, the flumes have end sections 12a which descend at a steeper inclination to a brining tank 15. The terminals of the flume sections 12a are disposed so as to discharge brine flowing through them lengthwise of the brining tank in the direction from the front to the rear end thereof.

The brining tank is filled with a salt solution to a substantial height, preferably to as near the upper edges of the bounding walls as may be without causing overflow due to the turbulence caused by brine pouring from the flumes. A constant circulation of brine through the tank and flumes is maintained by a pump 16, which is connected through a pipe 17 with the front end of the tank and discharges into a pipe 18, which leads to the flumes at the ends of the latter remote from the tank.

Details of one form of brining tank 15 and its accessories are shown in Figs. 2–5.

In the upper part of the tank, but mostly submerged in the brine therein, is an inclined deck or ramp 19. It is detachably connected to the side walls of the tank by lugs 20 and 21 at its forward and rear corners, respectively, and bolts 22 set in the tank walls projecting through holes in the lugs. Wing nuts 23 are screwed on the ends of the bolts to retain the lugs. The forward end of this ramp is preferably slightly above the normal quiet water level in the tank and its rear end and more than half its length are below that level. It is preferably made of a single plate of stiff sheet of non-corrodible metal, such as stainless steel, imperforate for most of its length but having numerous perforations in the rearmost part. Its perforated portion may be horizontal, as shown.

An inclined conveyer 24 is mounted with its lower end in the rear end part of the tank. This conveyer is constructed of (preferably) non-corrodible metal slats or strips 25 secured at their opposite ends to two chains 26 which pass around sprockets 27 in the tank close to the opposite side walls thereof. These sprockets are mounted on a shaft 28 located horizontally crosswise of the tank in bearings below the normal water level.

The conveyer chains pass also around sprockets 29 on an elevated shaft 30 mounted parallel to the shaft 28 in bearings on a frame 31. The frame 31 supports also an electric motor 32 which, through reduction gearing 33 and a shaft pulley 34, drives a belt 35 passing around a large pulley 36 on shaft 30. By this means the conveyer is driven at a suitable rate of speed.

At suitable intervals flights or lifters 37 are secured to the conveyer chains in place of the slats 26. These flights project perpendicularly from the plane of the conveyer far enough to engage and lift pieces of fish which pass to the conveyer from the ramp 19. A partial detail of one of the flights and its connection with one of the chains is shown in Fig. 5. The flight is made as a plate of (preferably) non-corrodible metal having a base flange 37a equal in width to one of the slats 25, and end guards 37b. Each end of the base flange, and likewise each end of every slat, is riveted to an angular strap 38 which is secured rigidly to one of the links of the chain. The flights and slats are formed with numerous perforations 39 to permit escape of brine lifted with the fish fillets.

Inclined extension side walls 40 are secured to the side walls of the tank and to the frame 31 at opposite sides of the conveyer. To each of them is secured a track 41 located to support the upper stretch of the conveyer against sagging, and confining strips 42 close to the upper or forward side of the conveyer and to the ends of the flights for preventing the fish pieces from falling away from the edges of the conveyer and the ends of the flights and being jammed thereby. A back plate 43 is secured to the frame 31 back of the rear or under stretch of the conveyer extending at its lower end into the rear end of the tank for deflecting into the tank anything that may drop from the conveyer.

A horizontal conveyer 44 is located with its forward end close to the upper end of conveyer 24 and below the upper sprockets 29 in position to receive pieces falling therefrom. It extends away to a delivery point, not shown.

A perforated shield or wall 45 extends from the rear end of the ramp 19 to the bottom of the tank and occupies the full width of the tank. It is cylindrically curved to be coaxial with the shaft 28 and is close to the orbit of the outer edges of the flights 37.

A strainer 46 is mounted at the front of the tank and is of suitable shape and dimensions to enclose a substantially large space around the entrance to the eduction pipe 17 so that all brine which flows to the pipe must pass through the strainer. Drain pipes 47 lead from one or both sides of the tank at the bottom thereof for withdrawing the contents when the brine needs to be changed. These pipes are closed by a valve, not shown, when the briner is in operation.

Baffles 48 are mounted in the bottom of the tank extending from side to side thereof. Their purpose is to obstruct scales, slime and sediment of any sort which may be washed from the fish pieces and prevent such matter from passing to the strainer and clogging it. They are connected to pivot rods 49 mounted in bearings in the sides of the tank and their lower extremities abut against stops 50 so disposed as to hold them against displacement by the pressure of the flowing brine, in vertical position with their bottom edges close to the tank bottom. But they may be swung away from the stops and from the tank bottom to permit washing away of the collected sediment when the brine is changed. A suitable means for so moving them is here shown, consisting of a rod 51 extending through the space between the front wall of the tank and the forward edge of the ramp 19 to connection with an arm 52 rising from one of the baffles. This arm is connected by a link 53 with a similar arm 54 connected with the other baffle. Preferably the baffles are formed with an upward extension 48a inclined against the current flow through the tank. The baffles are an optional feature and may be omitted or removed when the fish are well cleaned in advance of brining. But otherwise they are important accessory parts of the apparatus. There may be only one baffle or more than two, as may be needed, having regard to the length of the tank and other circumstances.

In the use of the apparatus the tank is charged with sodium chloride brine having whatever proportional content of salt may be required for a prescribed flavoring effect. When the foods treated are to be frozen, ice also is put in the tank, and replenished as it melts, in sufficient quantity to chill the brine, and thereby the fillets placed in it, to a temperature near the freezing point of water, say between about 32° F. and about 35° F. The brine is then constantly circulated through the flumes and tank by the pump and connections described.

Operators stationed at opposite sides of the conveyer 10 remove the fish fillets therefrom, place them on the windows of the adjacent candling table, inspect them visually, and then drop those which pass inspection into the adjacent flume. The brine flowing in the flumes carries the fillets along, and passes through the inclined end sections of the flumes with accelerated velocity. The turbulence of the brine, due to its high velocity and impact on the ramp or deck 19, tumbles the fish fillets vigorously, thereby giving them a thorough brining and washing, then carries them into the annular space bounded by the curved wall 45. The deck 19 is an important factor in this action. It divides the incoming brine from that in the lower part of the tank, causing a reversal of flow of the brine. That is, it prevents any of the fillets from sinking in the forward part of the tank and compels the incoming brine and all the fillets to pass to the conveyer. And it prevents the countercurrent flow of brine to the outlet connection 17 with the pump from opposing this travel of the fillets. The shield or wall 45 is a cooperating factor in this respect, since it prevents the pieces falling from the rear end of the deck from being carried away from the conveyer by the countercurrent flow of brine, and causes the pieces confined between it and the slats and lifters of the conveyer to be washed and tumbled by the strong flow of brine downward from the end of the deck and forwardly to the outlet. The numerous perforations in this wall of course permit passage of the brine with but little obstruction while all of the fillets are retained.

The conveyer 24 picks up the fillets which enter this space, as well as those which pass across it, and carries them out of the tank, depositing them on the conveyer 44. In the course of upward travel of the conveyer 24, the brine drains away from the fillets through the numerous holes and spaces of the conveyer, leaving only adherent films of brine on the fillets when they reach the horizontal conveyer.

From this point the fillets are carried on to the further final steps of packaging and freezing.

In the brining procedure performed by the apparatus here shown, the fillets are well washed and all loose scales and slime which may have been on them previously are removed. They are also cooled to a low temperature which facilitates subsequent freezing. From time to time the apparatus is emptied and filled with new brine. The frequency with which the brine needs to be changed depends on the thoroughness with which the fish have been previously washed and the quantity of fish being passed through the procedure in a given time. It may be changed every two hours, for instance, or at longer or shorter intervals, according to circumstances.

The fact that fillets placed in the parts of the flumes remote from the tank are immersed in brine longer than those placed in the flume at points nearer to the tank makes no material difference in the amount of salt which is absorbed by the fillets. Laboratory tests have proved that the absorption is almost the same whether the fillets are left in brine for five seconds or thirty seconds, provided the concentration of salt in the brine is the same, but more salt is taken up from stronger than from weaker brines.

The following table gives the results of tests on twelve samples, of which six were immersed for different lengths of time in 40% brine, five were immersed in 15% brine, and one was analyzed without immersion.

|  |  | Length of Time in Brine | Per Cent NaCl |
|---|---|---|---|
|  |  | Seconds |  |
| #1 | Brined in 40% Brine | 5 | .97 |
| #2 | ----do---- | 10 | 1.00 |
| #3 | ----do---- | 15 | .97 |
| #4 | ----do---- | 20 | 1.00 |
| #5 | ----do---- | 25 | 1.1 |
| #6 | ----do---- | 30 | 1.10 |
| #7 | No Brine, Plain for Control | ---- | 0.58 |
| #8 | Brined in 15% Brine | 5 | 0.76 |
| #9 | ----do---- | 10 | 0.62 |
| #10 | ----do---- | 15 | 0.67 |
| #11 | ----do---- | 20 | 0.72 |
| #12 | ----do---- | 25 | 0.71 |

In the usual commercial practice brine of from 12% to 14% concentration of salt is used.

The number of flumes which are combined with a single tank to discharge into it is not a limiting factor, and there may be only one or any number up to the limit imposed by the dimensions of the tank.

Figure 6:
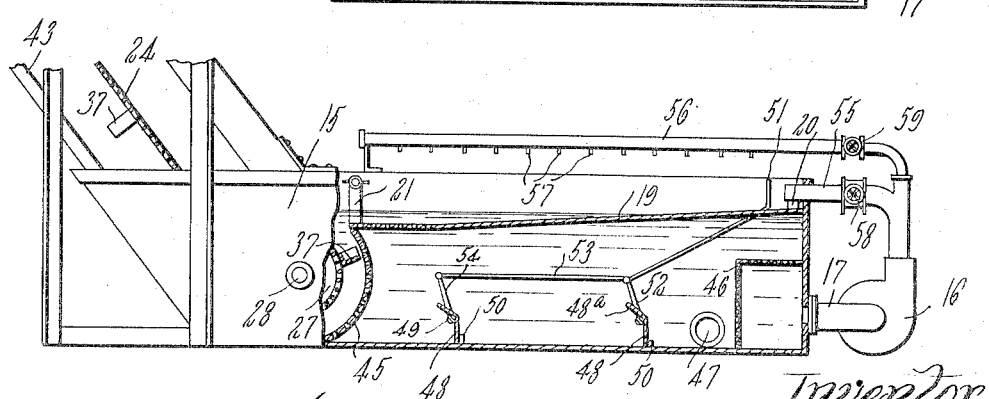
Fig. 6 is a sectional view of a form of apparatus embodying variations from that illustrated in the preceding figures.

The foregoing description of one phase and utility of the invention is not to be taken as limiting to a combination which includes flumes or in respect to the food articles which may be treated with the apparatus. The brine may be continuously delivered into the tank by other means while being continuously withdrawn and circulated. Thus Fig. 6 illustrates a modification in which brine withdrawn from the tank by the pump 16 is returned thereto through pipes 55 and 56, the former of which discharges a stream lengthwise of the tank from the front end over the deck 19, and the other extends lengthwise over the deck and is fitted with a series of nozzles 57 through which many sprays or streams are discharged. Both pipes are connected with the outlet of the pump and valves 58 and 59 are provided whereby either may be put into use exclusively or both simultaneously. The pieces of foodstuff may be placed on the deck by being dumped from containers in the hands of attendants or delivered by a conveyer, or otherwise. The constant withdrawal of brine from below the deck and constant admission through either or both pipes above it, aided by the slope of the deck, causes travel of the food pieces to the conveyer.

The deck is here shown as extending all the way to the front end wall of the tank, thus illustrating the fact that the deck may cover any desired portion of the length of the tank between the conveyer and the end from which the brine is withdrawn. Here the operating rod 51 for the baffles 48 passes through a notch or slot in the deck. In other respects the tank and its accessories are the same as shown in Figs. 2–5.

Split or whole fish as well as fillets, oysters, clams, shrimps, lobster meat, the meat of animals, various kinds of vegetables, and in short practically all foodstuffs which may need washing or brining as a step in their preparation for the market can be treated in this apparatus. Such food pieces as do not need to be inspected with the aid of transmitted light, or which have been previously inspected, can be dumped directly into a tank having the equipment shown in Fig. 6, or equivalent equipment; while in cases where inspection to detect the presence of parasites, blood clots, bruises, or other defects is carried on as a part of a continuous procedure, the apparatus employing candling tables and flumes is used. Also any of the food articles herein contemplated may be placed in a flume and conveyed by a stream of brine therein to the tank.

What I claim is:

1. An apparatus for washing and brining pieces of foodstuff, comprising a tank, an elevating conveyer mounted with its lower end in the tank and operable to lift pieces therefrom, a deck within the tank above its bottom extending from said conveyer toward the end of the tank remote from the conveyer, means for withdrawing liquid from beneath the deck at a point distant from the conveyer and delivering liquid to the upper side of the deck, a foraminous shield extending between the bottom of the tank and the end of the deck nearest to the conveyer in position to cause pieces falling from that end of the deck to be picked up by the conveyer, and a baffle disposed adjacent to the bottom of the tank below the deck between said shield and the liquid eduction point of the tank for arresting solid matter washed from the food pieces by the liquid, there being a clear space between the deck and the top of the baffle through which liquid flows.

2. An apparatus for treating pieces of foodstuff with liquid, comprising a tank having an outlet at one end, an inclined traveling conveyer having its lower end located in the end portion of the tank opposite to that where the outlet is located, a deck or ramp located in the tank above the bottom and below the upper limits of the bounding walls thereof, extending lengthwise of the tank and having one end terminal near the conveyer, said deck or ramp being imperforate as to its portion more remote from the conveyer, a flume having a discharge end over the imperforate part of the deck or ramp above the liquid in the tank and directed toward the conveyer, means for taking liquid from the space in the tank below the deck or ramp, a baffle extending across the tank at the bottom thereof between the conveyer and the tank outlet and being wholly below the deck and separated vertically therefrom, and operating means connected with said baffle operable to displace it from the tank bottom to permit washing away of sediment collected by the baffle.

3. The apparatus set forth in claim 2, combined with a baffle extending across the tank at the bottom thereof between the conveyer and the tank outlet, said baffle being wholly below the deck and separated therefrom and being capable of arresting sediment, and operating means connected with said baffle extending to a point clear of the deck where it may be grasped and actuated for shifting said baffle to displace it from the tank bottom to permit washing away of collected sediment.

4. An apparatus for washing and brining pieces of foodstuff, comprising a tank, an elevating conveyer mounted with its lower end in the tank and operable to lift pieces therefrom, a stationary deck within the tank above its bottom extending on an upward slope toward the end of the tank remote from the conveyer, means for withdrawing liquid from beneath the deck at a point distant from the conveyer, a conduit arranged to discharge liquid forcibly to the upper side of the deck on the upward sloping part thereof and in a direction toward the conveyer, and a foraminous shield extending between the bottom of the tank and the end of the deck nearest to the conveyer in position to cause pieces falling from that end of the tank to be picked up by the conveyer.

5. An apparatus for treating pieces of foodstuff with liquid, comprising a tank having an eduction connection at one end, a conveyer having outwardly projecting lifter elements and leading upward from the opposite end, a stationary deck or ramp between the ends and below the tops of the bounding walls of the tank, said deck extending laterally entirely across the space between the side walls of the tank and having a downward inclination toward the conveyer from its end which is nearest to the end of the tank from which the eduction connection leads, a conduit having an outlet above said deck or ramp arranged to discharge liquid upon the deck at a point near its higher end in a direction down the slope of the deck toward the conveyer, circulating means connected with said eduction connection and with the conduit at a point distant from the tank to withdraw liquid from the tank and return the liquid through the conduit, and a wall extending downward to the bottom of the tank from the end of the deck nearest to the conveyer, said wall being located adjacent to the outer extremities of the lifter elements of the conveyer to provide spaces into which foodstuff pieces and liquid passing from the deck may be received.

MICHEL P. VUCASSOVICH.

REFERENCES CITED

The following references are of record in the file of this patent:

UNITED STATES PATENTS

| Number | Name | Date |
| --- | --- | --- |
| Re. 14,447 | Kelley | Mar. 26, 1918 |
| 1,055,636 | Henderson | Mar. 11, 1913 |
| 1,732,180 | Brogden | Oct. 15, 1929 |
| 1,821,201 | Barry | Sept. 1, 1931 |
| 1,863,898 | Cooke | June 21, 1932 |
| 1,943,775 | Taylor | Jan. 16, 1934 |
| 2,043,739 | Erickson | June 9, 1936 |
| 2,162,415 | Allen | June 13, 1939 |
| 2,208,645 | Savrda | July 23, 1940 |
| 2,249,792 | Skinner | July 22, 1941 |